United States Patent [19]
Zelinger

[11] Patent Number: 5,267,529
[45] Date of Patent: Dec. 7, 1993

[54] GUIDING MUZZLE FOR DOGS

[75] Inventor: Jonathan Zelinger, New Hempstead, N.Y.

[73] Assignee: Ethical Products, Inc., Newark, N.J.

[21] Appl. No.: 71,959

[22] Filed: Jun. 7, 1993

[51] Int. Cl.$^5$ .......................................... A01K 25/00
[52] U.S. Cl. .................................. 119/831; 54/80.1; 119/856
[58] Field of Search ............... 119/129, 130, 131, 132, 119/133; 54/80.1, 80.3

[56] References Cited

U.S. PATENT DOCUMENTS

| | | | |
|---|---|---|---|
| 4,566,255 | 1/1986 | DeGroot | 119/130 |
| 4,603,659 | 8/1986 | Helphrey | 119/130 |
| 4,621,591 | 11/1986 | Anderson et al. | 119/130 |
| 5,136,984 | 8/1992 | Askinasi | 119/129 |

FOREIGN PATENT DOCUMENTS

| | | | |
|---|---|---|---|
| 2215973 | 10/1989 | United Kingdom | 119/129 |
| 2244634 | 12/1991 | United Kingdom | 119/130 |
| 2246278 | 1/1992 | United Kingdom | 119/130 |

Primary Examiner—Gene Mancene
Assistant Examiner—Todd E. Manahan
Attorney, Agent, or Firm—Anthony F. Cuoco

[57] ABSTRACT

A muzzle is arranged to fit over the snout of a dog and includes a pair of straps which are adjustably crossed around the neck area of the dog to secure the muzzle in place. A loop member extends downwardly from the muzzle and includes a ring to which a leash or the like for guiding the head of the dog is attached. An arrangement is thus provided which is useful for a variety of activities involving guiding a dog.

9 Claims, 3 Drawing Sheets

5,267,529

GUIDING MUZZLE FOR DOGS

BACKGROUND OF THE INVENTION

Those familiar with handling dogs are aware that when walking a dog, if the dog's head is properly guided, the dog's body will follow. Prior to the present invention, the only effective way for guiding the dog's head has been to attach a leash to the dog's collar and tugging and pulling on the leash to guide the head as desired. This often is tiresome and to little avail. The present invention obviates this disadvantage by providing a muzzle having a ring attached thereto for supporting a leash. The muzzle fits comfortably over the dog's snout while inhibiting biting, chewing and barking as is often desireable. With the arrangement described, the aforementioned tugging and pulling is eliminated, although panting, drinking and ease in breathing as required for the well being of the dog are still possible. Further, the arrangement is such that removal of the muzzle by the dog's paws, as is a natural tendency, is prevented.

SUMMARY OF THE INVENTION

This invention contemplates a guiding muzzle for dogs wherein the muzzle is arranged to fit comfortably over the dog's snout. A long strap is secured to one side of the muzzle and a short strap is secured to the opposite side thereof. The straps are arranged in an adjustable crossed configuration when the muzzle is placed on the dog and, when properly adjusted to accommodate the dog's neck anatomy, the straps are buckled together to secure the muzzle in place. A ring extends external the muzzle, whereby a leash or the like is secured thereto for the purposes intended. The dog's head is thus easily guided whereby the dog's body follows as intended. The invention as described is suitable for a variety of activities involving dogs, and is also ideal for handling a dog, as by a veterinarian or the like.

DETAILED DESCRIPTION OF THE INVENTION

Figure 1:
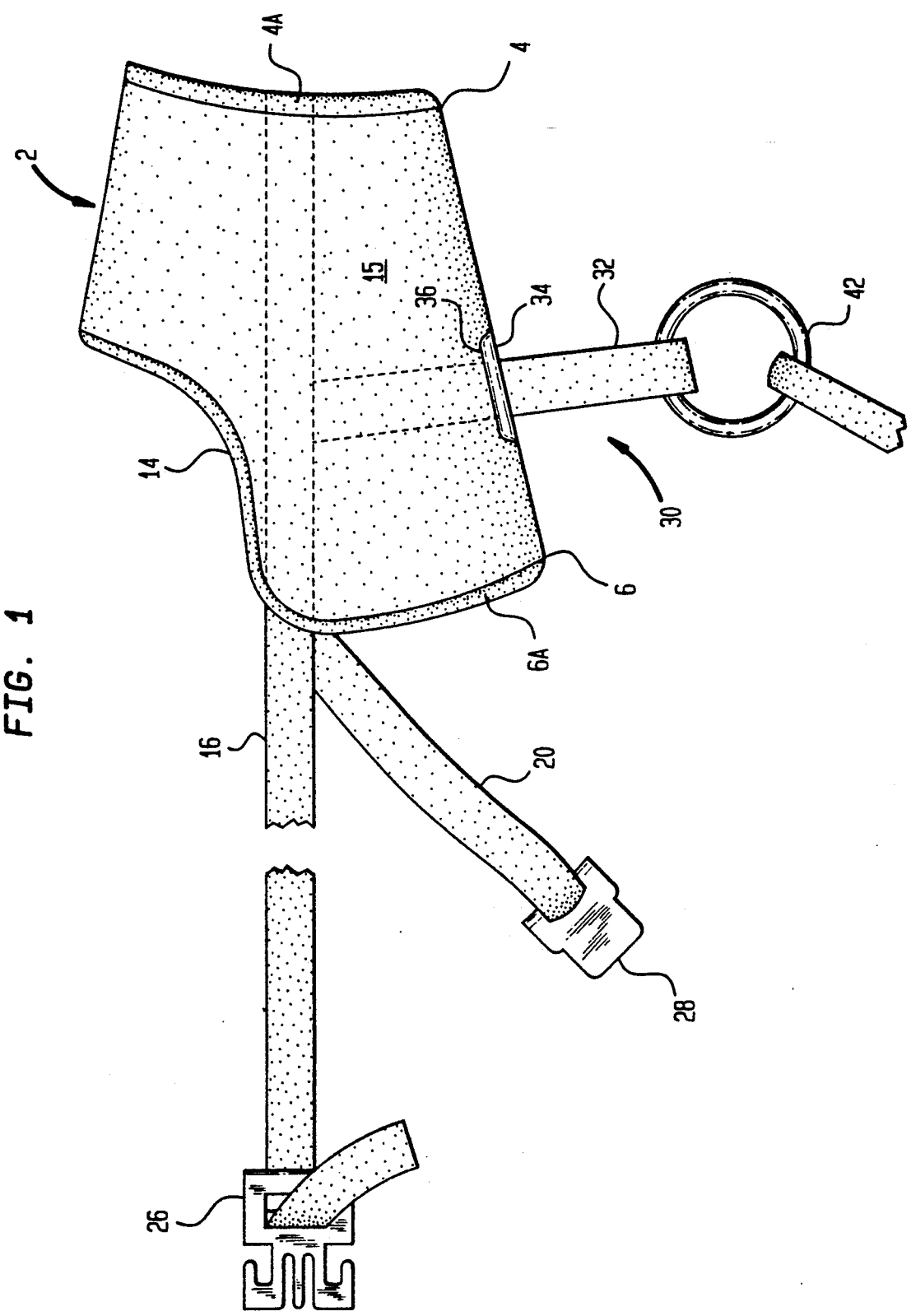
FIG. 1 is a diagrammatic elevational view showing one side of the muzzle of the invention.

A muzzle according to the invention is designated by the numeral 2. Muzzle 2 has an open front portion 4 and an open rear portion 6. Muzzle 2 fits over the snout 10 of a dog 12 so that the front portion 10A of the dog's snout extends through front portion 4 of muzzle 2. Muzzle 2 includes a rearwardly extending portion 14 which is arcuately formed so as to clear the rear portion 10B of the dog's snout including the dog's eyes 10C, as particularly shown in FIG. 3.

Figure 2:
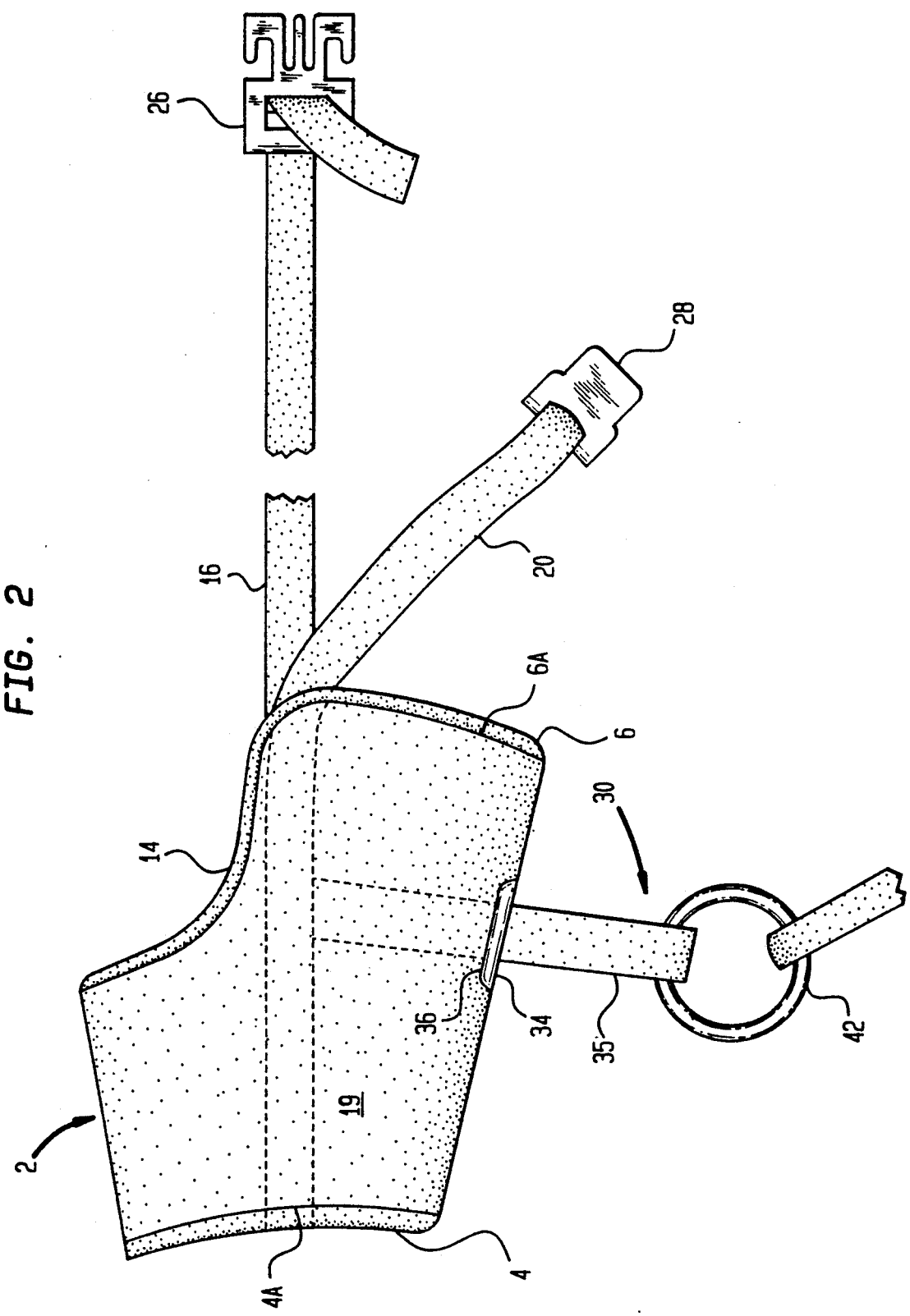
FIG. 2 is a diagrammatic elevational view showing the opposite side of the muzzle of the invention.

A long strap 16 is secured at one end thereof in longitudinal relation to one side 18 of muzzle 2 on the inner surface thereof, as particularly shown in FIG. 1, and a short strap 20 is secured at one end thereof in longitudinal relation to the other side 19 of muzzle 2 on the inner surface thereof, as particularly shown in FIG. 2. Straps 16 and 18 extend rearwardly and outwardly of the muzzle.

Long strap 16 carries a buckle portion 26 on the free end thereof and is adjustable on said buckle portion, as particularly shown in FIG. 1. Short strap 20 carries a buckle portion 28 on the free end thereof as also particularly shown in FIG. 1.

A loop member 30 is secured to both sides 18 and 19 of muzzle 2 on the inner surfaces thereof. Loop member 30 has one end 32 which is secured to side 18 of muzzle 2 on the inner surface thereof and extends downwardly and external muzzle 2 through an aperture 34 (FIG. 1) and has another end 35 secured to the opposite side 19 of muzzle 2 on the inner surface thereof and extends downwardly and external muzzle 2 through aperture 34 (FIG. 2). Aperture 34 is surrounded by a reinforced portion 36 so as to prevent fraying or other like wearing of the aperture area. With the arrangement described, and with particular reference to FIG. 3, it will be seen that sides 32 and 35 of strap 30 form a downwardly extending loop 38 external muzzle 2 which supports a ring or the like 40.

Figure 3:
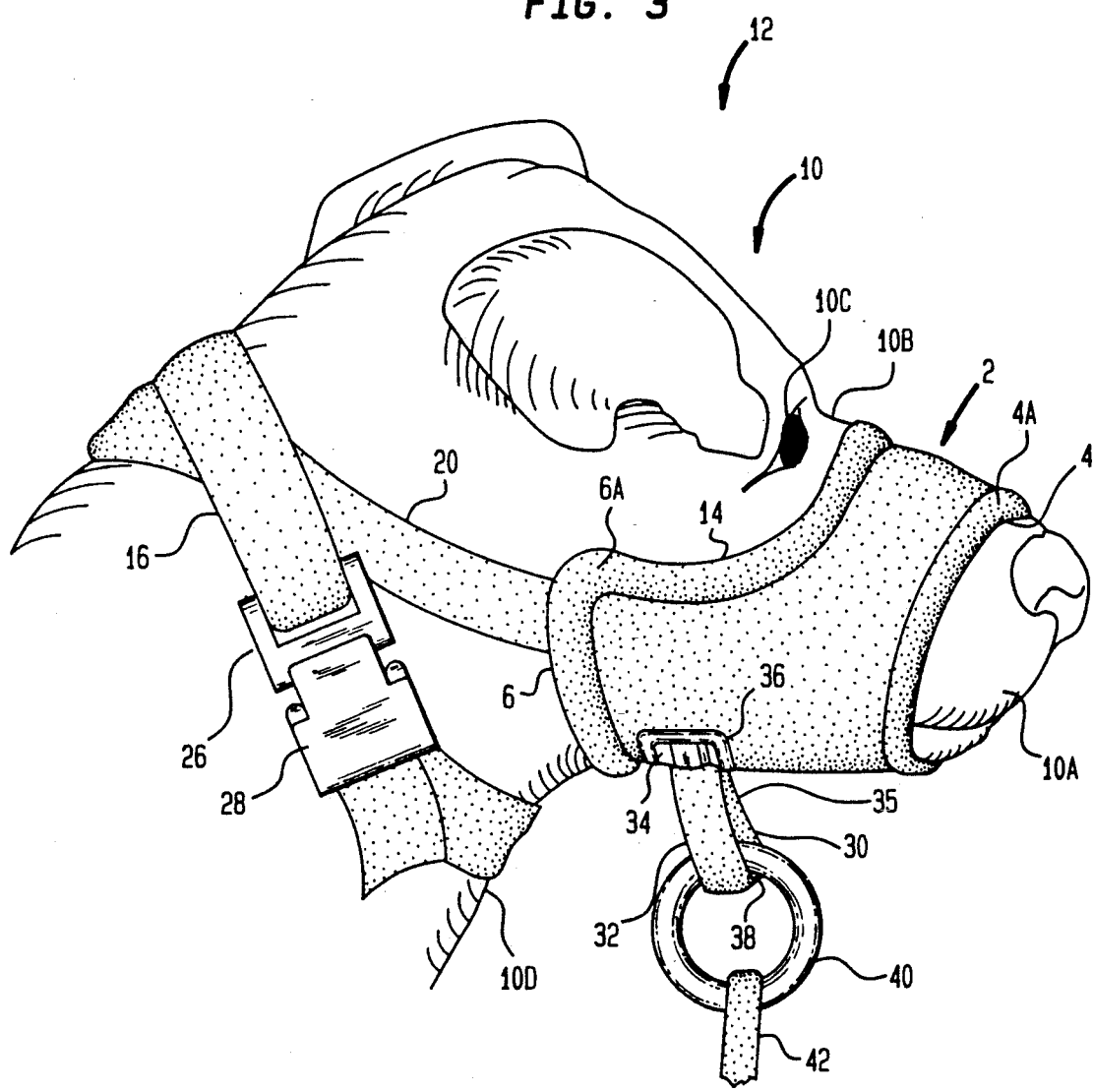
FIG. 3 is a pictorial representation showing the muzzle of the invention as worn by a dog.

The use of the invention is best illustrated in FIG. 3. Thus, muzzle 2 is placed over the dog's snout 10, making sure that a comfortable fit is provided. In this regard, it will be understood that muzzle 2 may be of various sizes to accommodate dogs of various sizes, as is desireable.

With the muzzle so placed on the dog and with the front 10A of the dog's snout extending through open muzzle front 4, long strap 16 is crossed over short strap 20 and around the dog's neck area 10D, bringing the buckle end of long strap 16 up to the buckle end of short strap 20, whereby buckle portions 26 and 28 are engaged to secure the muzzle in place. The length of long strap 20 may be adjusted in its buckle portion 26 so that the strap fits comfortably around the neck area 10D of the dog. A leash or the like 42 is attached to ring 40 for guiding the dog's head as is desired.

Muzzle 2, straps 16 and 20 and loop member 30 may be of a soft, flexible material, such as Nylon, so as to be comfortable when placed on the dog. Front end 4 and rear end 6 of the muzzle may have a suitable binding, such as 4A and 6A, disposed therearound for enhancing the wear and comfort characteristics of the muzzle. The muzzle is fabricated as by sewing or the like, as will be readily understood by those skilled in the art.

It will now be appreciated that a guiding muzzle for dogs has been provided, whereby the dog's head may be easily guided to insure that the animal's body follows the guide. Tugging and pulling, as has otherwise been necessary for the purposes desired, is eliminated. The natural activities of the dog, such as panting, drinking and breathing are not inhibited, yet biting, chewing and barking are inhibited, as may be desireable.

With the above description of the invention in mind, reference is made to the claims appended hereto for a definition of the scope of the invention.

What is claimed is:

1. A guiding muzzle for dogs, comprising:
   a muzzle portion fitting over the snout of a dog and including an open front and an open back;
   the front portion of the dog's snout extending through the open muzzle portion front, and the open muzzle portion back being arcuately formed so as to clear the rear portion of the dog's snout;
   a long strap secured to one side of the muzzle portion in longitudinal relation on the inner surface of said muzzle portion and including a buckle member thereon, said long strap extending generally rearwardly and outwardly of the muzzle portion;

a short strap secured to an opposite side of the muzzle portion in longitudinal relation on the inner surface of the muzzle portion and including a buckle member thereon, said short strap extending generally rearwardly and outwardly of the muzzle portion;

said long and short straps being arranged in crossed relation around the dog's neck area so that the buckle members thereon meet for being engaged, whereby the muzzle portion is secured in place;

a loop member secured to the one and the opposite sides of the muzzle portion on the inner surfaces thereof and extending generally downwardly and external the muzzle portion through an aperture therein; and a ring member carried by the loop member for supporting a leash for guiding the head of the dog.

2. A guiding muzzle for dogs as described by claim 1, wherein:

the long strap is adjustable in the buckle member thereon for adjusting the length of said long strap.

3. A guiding muzzle for dogs as described by claim 1, including:

reinforcing means surrounding the aperture for inhibiting wear on said aperture area caused by the loop member extending therethrough.

4. A guiding muzzle for dogs as described by claim 1, including:

binding means extending around the open muzzle portion front and the arcuately formed open muzzle portion back for enhancing the wear and comfort characteristics of the guiding muzzle.

5. A guiding muzzle for dogs, comprising:

a muzzle portion fitting over the snout of a dog and including an open front through which the front portion of the dog's snout extends and an open back;

a first strap secured to one side of the muzzle portion in longitudinal relation on the inner surface thereof so as to extend generally rearwardly and outwardly of said muzzle portion, and including a buckle member thereon;

a second strap substantially shorter than the first strap secured to an opposite side of the muzzle portion in longitudinal relation on the inner surface thereof so as to extend generally rearwardly and outwardly of said muzzle portion and including a buckle member thereon;

said first and second straps being arranged in crossed relation around the dog's neck area so that the buckle members thereon meet for being engaged, whereby the muzzle portion is secured in place;

a loop member secured to the one and the opposite sides of the muzzle portion on the inner surfaces thereof and extending generally downwardly and external the muzzle portion through an aperture therein; and a ring member carried by the loop member for supporting a leash for guiding the dog.

6. A guiding muzzle for dogs as described by claim 5, wherein:

the first strap is adjustable in the buckle member thereon for adjusting the length of said first strap.

7. A guiding muzzle for dogs as described by claim 5, including:

reinforcing means surrounding the aperture for inhibiting wear on said aperture caused by the loop member extending therethrough.

8. A guiding muzzle for dogs as described by claim 5, wherein:

the open back of the muzzle portion is arcuately formed to clear the back portion of the dog's snout.

9. A guiding muzzle for dogs as described by claim 8, including:

binding means extending around the open muzzle portion front and the arcuately formed open muzzle portion back for enhancing the wear and comfort characteristics of the guiding muzzle.

* * * * *